UNITED STATES PATENT OFFICE.

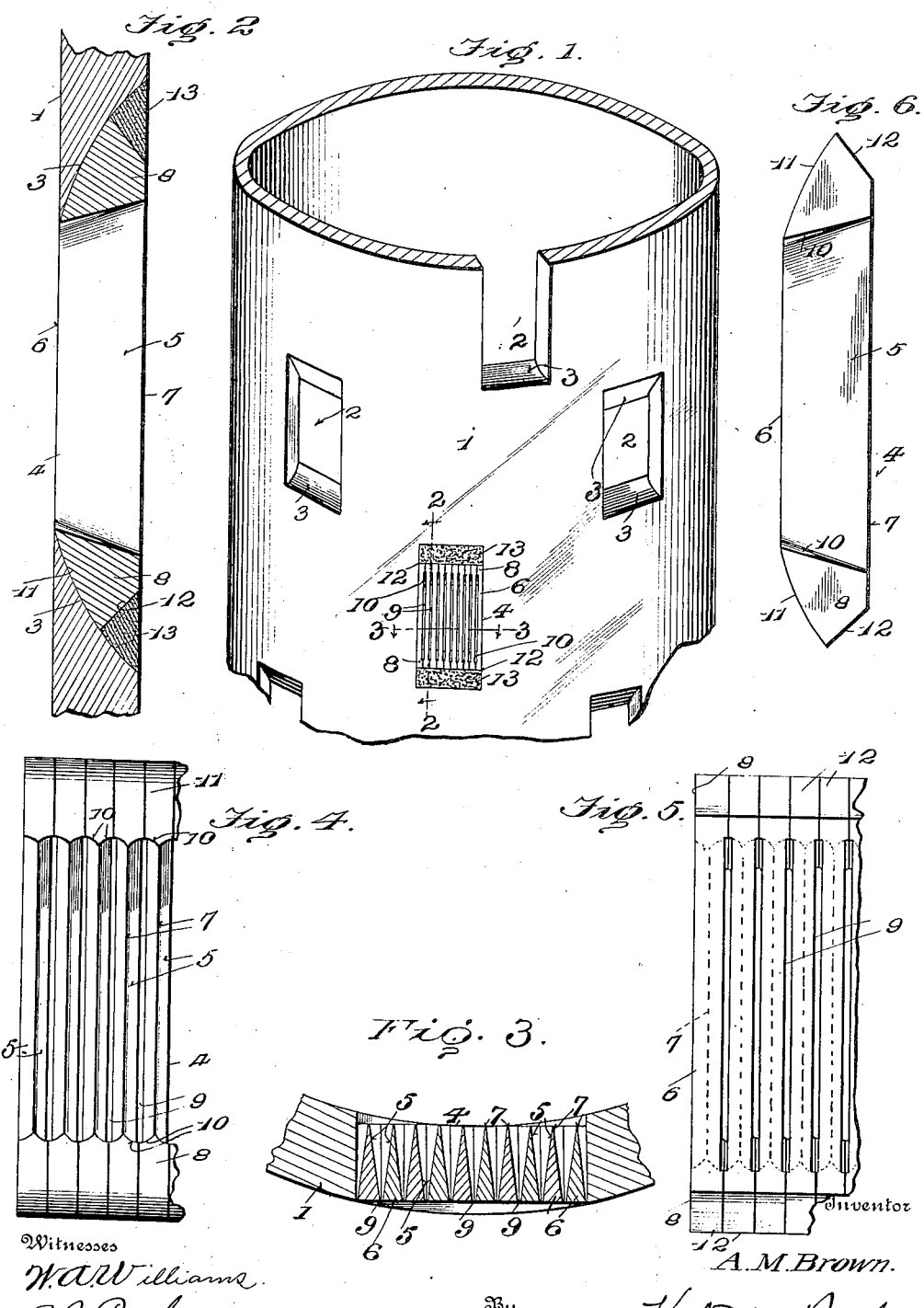

ARTHUR M. BROWN, OF HOUSTON, TEXAS, ASSIGNOR OF ONE-HALF TO G. W. STANCLIFF, OF HOUSTON, TEXAS.

WELL-STRAINER.

No. 890,598.   Specification of Letters Patent.   Patented June 16, 1908.

Application filed December 12, 1907. Serial No. 406,226.

*To all whom it may concern:*

Be it known that I, ARTHUR M. BROWN, a citizen of the United States, residing at Houston, Harris county, Texas, have invented certain new and useful Improvements in Well-Strainers; and I do hereby declare the following to be a full, clear, and exact description of the invention, such as will enable others skilled in the art to which it appertains to make and use the same.

This invention relates to certain improvements in strainers or screens for well tubes, pipes or casings; and the objects and nature of the invention will be readily understood by those skilled in the art in the light of the following explanation of the structure shown in the accompanying drawings as my preferred embodiment from among other formations or arrangements within the spirit and scope of my invention.

An object of the invention is to provide certain improvements in inserted bar strainers with the end in view of reducing the cost of production and at the same time producing a strainer of efficiency and of marked advantage and utility.

The invention consists in certain novel features in construction and in combinations and arrangements as more fully and particularly set forth hereinafter.

Referring to the accompanying drawings: Figure 1, is a perspective view showing a portion of a tube, pipe or casing formed in accordance with my invention, certain of the liquid inlet openings being screened in accordance with my invention while other openings are shown to which the screening bars have not been applied. Fig. 2, is a longitudinal section on the line 2—2—Fig. 1. Fig. 3 is a cross section on the line 3—3, Fig. 1. Fig. 4, is a plan of several of the bars assembled showing the inner faces thereof. Fig. 5, is a plan thereof showing their outer faces. Fig. 6, is a side view of one of the bars.

In the drawings, I show a section of a tube, pipe or casing 1, such as employed in an oil, water or other well, or wherever a strainer can be used to advantage. The portion 1, illustrated is employed at the liquid inlet or receiving portion of the pipe. The pipe is formed with spaced inlet openings 2. These openings can be arranged in series around the pipe, as well as in series longitudinally thereof, and any suitable number of openings can be employed uniformly spaced or otherwise, and all of the same size or area or otherwise, and of any desirable or suitable shape or form.

In the specific example illustrated, the openings are of a uniform size and shape and are uniformly spaced, and each opening is oblong in shape and arranged longitudinally of the pipe, although I do not wish to so limit my invention.

Each opening through the wall of the pipe is shown formed with straight flat parallel side walls, and with inwardly concaved or curving transverse or end walls 3, thereby forming an opening of uniform width from the exterior of the pipe to the interior thereof, but of greater length at the exterior of the pipe than at the interior thereof, or in other words the opening tapers or reduces inwardly in length.

If so desired, the transverse walls 3, can concave or curve from a common center or of the same radius, whereby a rotary cutting tool can be employed to quickly and economically cut the slots or openings through the pipe wall, all of the same area and dimensions.

Each opening 2, is screened or provided with a straining surface composed of a series of parallel abutting usually similar and separately formed bars 4, inserted and secured in the opening and arranged longitudinally thereof and filling the same from side wall to side wall.

Each bar is composed of an elongated thin plate of suitable metal, swaged, pressed or reduced on both side faces of its intermediate portion to form the flat transverse angular or uniformly inclined converging faces 5, extending from the flat outer longitudinal edge 6, of the bar and practically meeting at the sharp or thin inner longitudinal edge 7, of the bar. Said thin inner edge 7 of the bar is in length practically equal to the length of the inner opening or side of the opening 2, in the pipe. The bar is swaged or reduced at its side faces 5, to form the liquid inlet slits or passages 9, through the assembled bars and also to form the similar flat opposite end heads 8, of the bar which close the ends of said slits through or between the assembled bars. The reduced side portions or faces 5, of the bar usually taper or reduce in length from the outer to the inner edge of the bar, and the opposite ends of side faces 5, terminate in beveled faces 10, joining the flat parallel side faces of the end heads 8, and said inclined side faces 5, between said end heads.

The flat bottom or inner edges 11 of the end heads 8, are longitudinally curved outwardly to conform to the curvature of the end walls 3, of the openings, and to rest on said walls, while the outer longitudinal edges 12, of said heads are usually extended inwardly at an angle. The end heads 8, are usually formed with parallel side faces and are preferably of the same thickness throughout and are of greater thickness than any part of the intermediate portion of the bar between said end heads.

Each liquid inlet opening 2, in the pipe is practically filled or bridged by a series of these similar bars arranged side by side in parallelism with the flat side faces of their end heads directly abutting and thereby spacing the depressed side faces 5, of the bars to form the liquid inlet slits or passages between the inclined faces 5, of the bars. The inlet openings are each formed of such width as to snugly receive a certain number or set of said assembled bars, with the outer side faces of the end heads of the end bars engaging the side walls of the opening and spacing the outer faces 5, of said end bars from said walls to form liquid inlet slits between said walls and faces 5.

The outer edges of the set of bars arranged in each inlet opening are usually about flush with the outer surface of the pipe, and the under or inner edges of the end heads rest on and abut against the curved end walls of said inlet openings, while the reduced ends caused by outer inclined edges 12, leave V depressions over the reduced ends of the bars and the upper portions of the end walls of the inlet openings into which solder, spelter or the like 13, can be run to fill the depressions and fasten and secure the set of bars in the opening.

The bars are separately formed and are loosely placed together and inserted in the inlet opening, and are therein secured by the solder or by other suitable means.

The slits between the strainer bars taper or increase inwardly in width, so that the inflowing liquid can force grit and hard particles of sand or the like inwardly from the slits and thus permit clearing thereof.

If the strainer needs cleaning, a cylindrical wire brush of greater diameter than the casing can be inserted therein and reciprocated longitudinally in the strainer section, and the strainer bars are so formed and arranged that the brush wires will project through the slits between the strainer bars and cut out and force therefrom gum, paraffin or other substance which may have collected therein.

The bars are usually composed of metal, such as brass or other suitable metal capable of resisting the action of water or oil.

The openings can be economically cut or formed in the pipe with comparative speed and the bars can be made at a comparatively low cost, and easily and quickly inserted and secured in the inlet openings. By varying the thickness of the end heads, the bars can be made to produce the narrow water inlet slits of the desired width to suit conditions.

It is evident that various changes might be resorted to in the forms, dimensions, and arrangements of the parts described without departing from the spirit and scope of my invention hence I do not wish to limit myself to the exact construction disclosed.

What I claim is:—

1. A pipe having an inlet opening therethrough having flat parallel side walls and inwardly curved approximately converging end walls, and a strainer secured in said opening and consisting of a series of similar parallel abutting bars having depressed intermediate portions forming the inlet slits, substantially as described.

2. A pipe having inlet openings therethrough, in combination with screens in said openings, each screen consisting essentially of a series of parallel abutting separately formed bars inserted in the opening and engaging the end walls thereof and having reduced portions forming intervening inlet slits, and means extending across the outer faces of the opposite bar ends in the opening and fixing the series of bars therein, substantially as described.

3. A pipe having an inlet opening therethrough formed with converging end walls, in combination with a strainer for said opening consisting of a series of parallel separate bars inserted and secured in said opening and resting against said end walls, said bars formed with abutting end heads and with intermediate depressed portions.

4. A pipe having an elongated opening therethrough with inwardly converging end walls, and flat parallel side walls in combination with a series of parallel similar bars at their ends fitting and secured on said end walls, the portions of the bars between said end walls being separated to form intervening inlet slits.

5. A strainer for pipes comprising a series of parallel abutting bars adapted to be inserted and secured in an inlet opening in a pipe, each bar formed with similar end heads and transversely depressed at the opposite faces of the intermediate portion to form the inwardly converging inclined side faces, said end heads having inner converging bearing faces, and being reduced at their outer edges.

6. As a new article of manufacture, a strainer bar for inserted bar well pipe strainers, consisting of an elongated flat piece of metal having opposite end heads and intermediate inclined side faces converging from the outer longitudinal edge of the bar to the inner longitudinal edge thereof between the end heads, said end heads having longitudinally converging bearing faces at their inner edges, substantially as described.

7. A pipe having an inlet opening with inwardly converging opposite walls, in combination with a series of parallel similar strainer bars inserted and secured in said opening and having end heads engaging said walls, said bars formed with depressed longitudinal opposite side faces converging inwardly and decreasing inwardly in length, whereby the bars form intervening slit inlet passages increasing inwardly in width and decreasing inwardly in length.

8. A pipe having inlet openings therein and arranged longitudinally thereof, each opening having flat parallel longitudinal walls and inwardly curved converging end walls, and a strainer secured in said opening and consisting of a series of separately formed abutting bars having depressed intermediate portions forming longitudinal inlet slits, the bar ends having inner converging bearing faces resting on said end walls, and means securing the bars on said end walls.

9. A casing formed with an inlet opening having inwardly curved converging end walls, and a series of strainer bars secured in and arranged longitudinally of said opening and fitted on said end walls, intermediate longitudinal portions of said bars having inclined side faces separated to form inlet slits between the bars, substantially as described.

10. A pipe having an inlet opening with opposite converging walls, and a series of strainer bars inserted in said opening and having depressed side faces to form intervening inlet slits, the bar ends having inner bearing faces resting on said converging walls and having outer reduced faces, and securing means for the bars inserted in the ends of the opening and down on said reduced outer faces of the bars.

In testimony whereof I affix my signature, in presence of two witnesses.

ARTHUR M. BROWN.

Witnesses:
　Louis Wied,
　J. M. Winfrey.